United States Patent
Smith

(12) 
(10) Patent No.: US 6,500,378 B1
(45) Date of Patent: Dec. 31, 2002

(54) METHOD AND APPARATUS FOR CREATING THREE-DIMENSIONAL OBJECTS BY CROSS-SECTIONAL LITHOGRAPHY

(75) Inventor: Jeffrey M. Smith, Dalton, MA (US)

(73) Assignee: EOM Technologies, L.L.C., Dalton, MA (US)

( * ) Notice: Subject to any disclaimer, the term of this patent is extended or adjusted under 35 U.S.C. 154(b) by 216 days.

(21) Appl. No.: 09/615,906

(22) Filed: Jul. 13, 2000

(51) Int. Cl.[7] .................. B29C 35/08; B29C 41/02; G02B 26/08; G02F 1/29
(52) U.S. Cl. .................. 264/401; 264/308; 359/298; 425/174.4; 425/375
(58) Field of Search .................. 264/308, 401; 425/174.4, 375; 359/298

(56) References Cited

U.S. PATENT DOCUMENTS

| | | |
|---|---|---|
| 4,041,476 A | 8/1977 | Swainson |
| 4,575,330 A | 3/1986 | Hull |
| 4,752,498 A | 6/1988 | Fudim |
| 5,009,585 A * | 4/1991 | Hirano et al. ............ 425/174.4 |
| 5,015,424 A | 5/1991 | Smalley |
| 5,061,049 A | 10/1991 | Hornbeck |
| 5,143,817 A | 9/1992 | Lawton et al. |
| 5,247,180 A | 9/1993 | Mitcham et al. |
| 5,263,130 A | 11/1993 | Pomerantz et al. |
| 5,461,411 A | 10/1995 | Florence et al. |
| 5,539,568 A | 7/1996 | Lin et al. |
| 5,545,367 A | 8/1996 | Bae et al. |
| 5,573,721 A | 11/1996 | Gillette |
| 5,870,176 A | 2/1999 | Sweatt et al. |
| 5,872,880 A | 2/1999 | Maynard |
| 5,980,813 A | 11/1999 | Narang et al. |
| 6,040,935 A | 3/2000 | Michalicek |
| 6,051,179 A | 4/2000 | Hagenau |

OTHER PUBLICATIONS

Digital Light Processing TM for High–Brightness, High–Resolution Applications by Larry J. Hornbeck (Jul. 1998) Texas Instruments Incorporated, P.O. Box 655012, MS41, Dallas TX 75265.

* cited by examiner

Primary Examiner—Leo B. Tentoni
(74) Attorney, Agent, or Firm—Schmeiser, Olsen & Watts

(57) ABSTRACT

A method and apparatus for creating a three-dimensional object by generating a cross-sectional pattern of energy of an object to be formed at a selected surface of a medium capable of altering its physical state in response to the energy projected or transmitted onto the selected layer. By impinging radiation, particle bombardment, or chemical reaction by a method controlled by a spatial light modulator, successive adjacent cross-sections of the object are rapidly formed and integrated together to provide a step-wise laminar build-up of the desired object creating a three dimensional manifestation from bitmap images of a series of cross-sections of a computer generated model.

51 Claims, 7 Drawing Sheets

METHOD AND APPARATUS FOR CREATING THREE-DIMENSIONAL OBJECTS BY CROSS-SECTIONAL LITHOGRAPHY

BACKGROUND OF THE INVENTION

1. Technical Field

This invention relates generally to the field of rapid prototyping (RP) manufacturing or processes.

2. Related Art

RP is a technology which has seen great advances since its initial application in the 1980's. In one common embodiment known as stereolithography, RP manufacturing comprises a bath of curable liquid wherein some movable point within the bath is subjected to stimulation by a prescribed curing source. As the source is moved with respect to the bath or as the bath is moved with respect to the source, the point which undergoes solidification or curing is constantly made to move. The result is the construction of a solidified mass of cured material contained within the otherwise liquid bath. The region commonly solidified occurs at or very near the surface of the bath in most practical applications. As the liquid is solidified, the solid structure is progressively lowered into the bath allowing the uncured liquid to flow over the surface which is in turn subjected to the same process. By continuing to solidify these very thin layers or laminae, the solid object is built up into its final shape. Bonding of one layer to a previous layer is an inherent property of the process as is known in the art. An adequate description of this process can be found in U.S. Pat. No. 4,575,330 issued to Charles W. Hull, which is hereby incorporated by reference.

The main advantages of the RP process are its ability to drastically reduce the time between product conception and final design, and its ability to create complex shapes. More traditional modeling or prototyping is obtained from an iterative generation of a series of drawings which are analyzed by the design team, manufacturing, the consumer, and perhaps others until a tentative final design results which is considered viable. This agreed upon design is then created by casting and/or machining processes. If molds are needed, these must be fabricated as well. The finished prototype is then tested to determine whether it meets the criteria for which the part was designed. The design and review process is often tedious and tooling for the creation of the prototype is laborious and expensive. If the part is complex, then a number of interim components must first be assembled. The prototype itself is then constructed from the individual components.

Use of RP significantly reduces the expense and time needed between conception and completion of the prototype. Commonly, the concept is rendered in CAD (computer aided design). As this process is fully electronic, drawings are not required for fabrication. The CAD system is used to generate a compatible output data file that contains information on the part's geometry. This file is typically converted into a "sliced" data file that contains information on the part's cross-section at predetermined layer depths. The RP control system then regenerates each cross-section sequentially at the surface of the curable resin. The fabricated part can be analyzed by the team or used for various form, fit, and functional tests. Due to the rapid speed and low cost of the process, several designs can be fabricated and evaluated in a fraction of the time and for significantly less than it would take to machine each concept. Since the RP process creates the structure by the creation of very thin laminae, complex components with internal complexities can be easily rendered without requiring the assembly of a plurality of individual components.

A disadvantage of RP other than its initial cost for the technology is that the time associated with the creation of each part can be longer than desired. Since creation of the part occurs in a point-by-point, layer-by-layer process, the time necessary to produce a single part can become excessive. For instance, an arbitrary part of six cubic inches with a 50 percent fill ratio will require approximately six hours to image utilizing current stereolithographic techniques having a 0.005 inch layer build, a laser spot size of 0.010 inches, and a 100 inch per second laser rate assuming no losses. This estimate comprises imaging time alone and does not account for platform movement, sweeping of the resin surface, resin setting time, and mirror inertias that take considerable time between formation of each lamina. Reduction in fabrication times continue to be a desirable goal. Though the above description pertains to the process of stereolithography; the process, as well as the general advantages and disadvantages are similar for other RP technologies.

Another disadvantage of RP specific to stereolithography is that parts produced by this process leave the bath in a very soft state requiring a post-cure process. This too takes time, typically a minimum of 20 minutes. In this soft state, the part is very deformable. Since the part is removed from the bath in a fragile state, supports are often needed to assist in the part's creation and to ensure proper post-curing without significant deformation. In fact, these supports are often vital to parts created by stereolithography especially those parts having overhanging or other unsupported features. The soft state associated with conventional stereolithography is inherently unavoidable for at least two reasons. The first is that the stereolithography though not as rapid as the present invention is still optimized for speed. Thus, increasing the exposure time of the laser at each point on the surface of the resin would significantly increase the processing time of the part. Secondly, to create the part, the laser is rastered without overlapping and the energy at the forming lamina has a gaussian distribution. This traps uncured photopolymer between cured lines. This could be avoided by overlapping the laser paths; however, this would also greatly increase processing time.

Accordingly, the development and production of a faster method to create prototypes and finished parts using RP technology is a desirable goal. Improvement to the existing processes would greatly increase the use of RP and would result in the continued advancement of technology in general due to the increased ease in the creation of complex parts.

SUMMARY OF THE INVENTION

Briefly, the method and apparatus comprises processing an entire cross-section of the object at one time. By reducing the time needed to stimulate the bath surface to form the laminae, the entire object could be formulated more quickly. Increasing the quantity of material stimulated at each time interval is a preferred way to perform this function. The invention therefore comprises a method of solidifying a discrete quantity of a curable medium by subjecting the surface of said medium to a prescribed energy source and controlling that source in such a fashion to cure only the portion desired while leaving the remainder of the medium uncured. To accurately image an entire cross section at any one time in this manner requires accurate control of the energy source. The means currently preferred to accomplish this is through use of reflective digital light switch technology. This technology was created by Texas Instruments (TI) and is currently referred to as deflectable beam spatial light modulation (SLM). TI refers to the process when applied to its typical applications under their common law trademark as Digital Light Processing (DLP). More specifically, they refer to the critical mechanism used as a Digital Micromirror Device (DMD). U.S. Pat. No. 5,061,049 for a "Spatial light modulator and method" issued on Oct. 29, 1991 to L. Hornbeck of Texas Instruments provides the basic configuration of such a device. Further descriptions of this technology can be found in numerous white papers by TI as well as issued patents including among others, a presentation placed in writing originally given by Larry J. Hornbeck entitled "Digital Light Processing for High-Brightness, High-Resolution Applications" on Feb. 10–12, 1997 in San Jose Calif. A history of the development of the DMD can be found by the same author in an article titled "From cathode rays to digital micromirrors: A history of electronic projection display technology", TI Technical Journal, July–September 1998. In the alternative, a Thin-Film Micromirror Array (TMA), comprising a plurality of micromachined thin-film piezoelectric actuators, may also be used.

In simplified terms, a DMD is microelectromechanical device comprising a plurality of tiny mirrored surfaces which each can be independently pivoted from a first to a second position. The mirrors are formed into the surface of a semiconductor chip and through the application of an appropriate voltage to the circuitry built under each mirror, that mirror may be made to tilt to one side or another with respect to a plane normal to the semiconductor chip. Further, with respect to some fixed frame of reference, pivoting in one direction causes the mirror to reflect light whereas pivoting in the opposite direction causes the light to be deflected from the fixed frame of reference. As such, to a viewer within the frame of reference, the mirror is either fully on or fully off depending on the direction in which it is pivoted. Each of the mirrors can be independently controlled to be at either of the tilt angles. Since each mirror typically represents a single pixel, a black and white image can be generated by setting the appropriate mirrors to the appropriate position. Both color images and shades of gray are possible with this technology through the use of colored filters for the former and mirror modulation for the latter. The technology associated with color is not important to the present invention other than at an appropriate specific wavelength of the light spectrum best suited to cure an appropriate medium However, utilizing shades of gray by modulating individual mirrors does have some application to the present invention and will be more appropriately discussed below.

By coupling this spatial light modulation technology to rapid prototyping, great gains are possible in the speed of creation of the prototype. Similar to point by point prototyping, as each succeeding lamina is imaged, a quantity of uncured material is added and selectively cured to form an adjacent lamina. The laminae are adjoined one to the other so that the successive laminae form a continuous solid object comprising the cured material. Using spatial light modulation technology eliminates the need to scan the energy source over each point in turn prior to the solidification of an entire lamina.

In an embodiment, by way of example and not by way of limitation, the invention utilizes a gas discharge lamp as the radiation energy source. The invention is also adaptable to any radiant energy source capable of being reflected, provided the reflected energy satisfies the requirements of the reactive material. One such example includes lasers. The use of lasers in RP is known in the art since it is currently being utilized for selective laser sintering, stereolithography as described above, and laminated object manufacturing.

In accordance with the invention, a method of generating a three-dimensional object layer by layer from a medium, comprises the steps of providing at least one energy source, and at least one spatial light modulator array having a plurality of individually controlled elements which are each capable of selectively and at least bi-directionally reflecting energy from the energy source. The method further comprises receiving data which corresponds to a two-dimensional cross-section or individual lamina taken from the three-dimensional object desired to be formed and generating control signals to selectively direct a quantity of the individual reflecting elements in either a first or a second direction, one of the directions corresponding to that direction which reflects energy from the energy source off of the spatial light modulator array or arrays and onto the medium The energy reflected onto the medium causes that portion of the medium in receipt of the reflected energy to undergo a solidification reaction thereby forming a replica in the medium of the two-dimensional cross-section stored in the data. Once the cross-section is satisfactorily solidified, the cross-section is lowered into the medium, additional uncured material is added to the surface, and the process is repeated incrementally for each two-dimensional cross-section until the entire three-dimensional object is replicated in the medium.

One of the primary advantages of the present invention is the projected degree of cure of a part emerging from the resin bath Since the present invention cures an entire cross-section at the bath's surface at a single time, parts do not contain trapped, uncured resin. Additionally any increase in exposure time, if required, would be minimal. The predicted imaging time for a single lamina created by the present invention of cross-sectional lithography is estimated to be on the order of one second versus 18 to 36 seconds for the same lamina utilizing conventional stereolithography. Increasing exposure by 20 percent would equate to adding roughly three minutes to the creation of a 1000 laminae part by cross-sectional lithography whereas it would add 1.2 hours to the creation of the same part utilizing conventional stereolithography. Since cross-sectional lithography cures an entire lamina in one increment, and since it does not require raster filling of the image, surface geometry is irrelevant with respect to time. As such one object of the present invention is to provide a method to substantially reduce the time necessary to generate a three-dimensional object utilizing an RP process.

A second embodiment of the present invention provides a microfabrication stereolithography system, comprising at least one reduction lens to reduce the size of the image reflected by the spatial light modulator, and an optical window which provides a focal point for the incoming energy source, as well as establishing and maintaining a planar curing surface.

A third embodiment of the present invention provides an inverted stereolithography system comprising an optical window located substantially near the bottom of the container.

The inverted system further includes a target platform mounted to the underside of the elevator platform, such that the part may be lifted away from the window as each layer is cured, and removed from the container after completion.

It is further advantage of the present invention to provide a method for imaging an entire cross-section of the object at each time interval by a process now known as cross-sectional lithography.

It is further advantage of the present invention to improve the speed of existing rapid prototyping technologies.

It is another advantage of the present invention to provide a method of reflecting an energy source in order to image an entire cross-sectional area of material simultaneously thereby creating a complete lamina of solidified material comprising one layer in a plurality of stacked laminae forming the solid object.

It is a further advantage of the present invention to provide a method adaptable for use in other RP processes which utilize beam sources conducive to reflection or transmission in the case of light valve technology such as electron and particle beam Yet a further advantage of the present invention is to provide a method adaptable for use in RP processes which utilize any wavelength of radiation conducive to reflection from the electromagnetic spectrum.

Yet another advantage of the present invention is to improve the rapidity, economy, and desirability of rapid prototyping technology.

Another advantage is to provide a process which can create parts exhibiting improved final tolerances, reduction in material waste, reduction or elimination of the reliance on structural supports or posts, and a reduction or elimination of post-curing.

Still a further advantage of the present invention is to improve the accuracy of the process through the ability to precisely modulate the transmitted energy of the energy source.

Still further advantages are to provide the ability to create parts in any size with any accuracy through the use of a lens system. These and other advantages of the present invention will become more readily apparent from the detailed description given hereafter. However, it should be understood that a detailed description and specific examples, while indicating preferred embodiments of the invention, are given by way of illustration only, since various changes and modifications within the spirit and scope of the invention will become apparent to those skilled in the art from this description.

BRIEF DESCRIPTION OF THE DRAWINGS

The invention can be more fully understood from the following detailed description thereof in connection with accompanying drawings described as follows.

DESCRIPTION OF THE PREFERRED EMBODIMENTS

Figure 1:
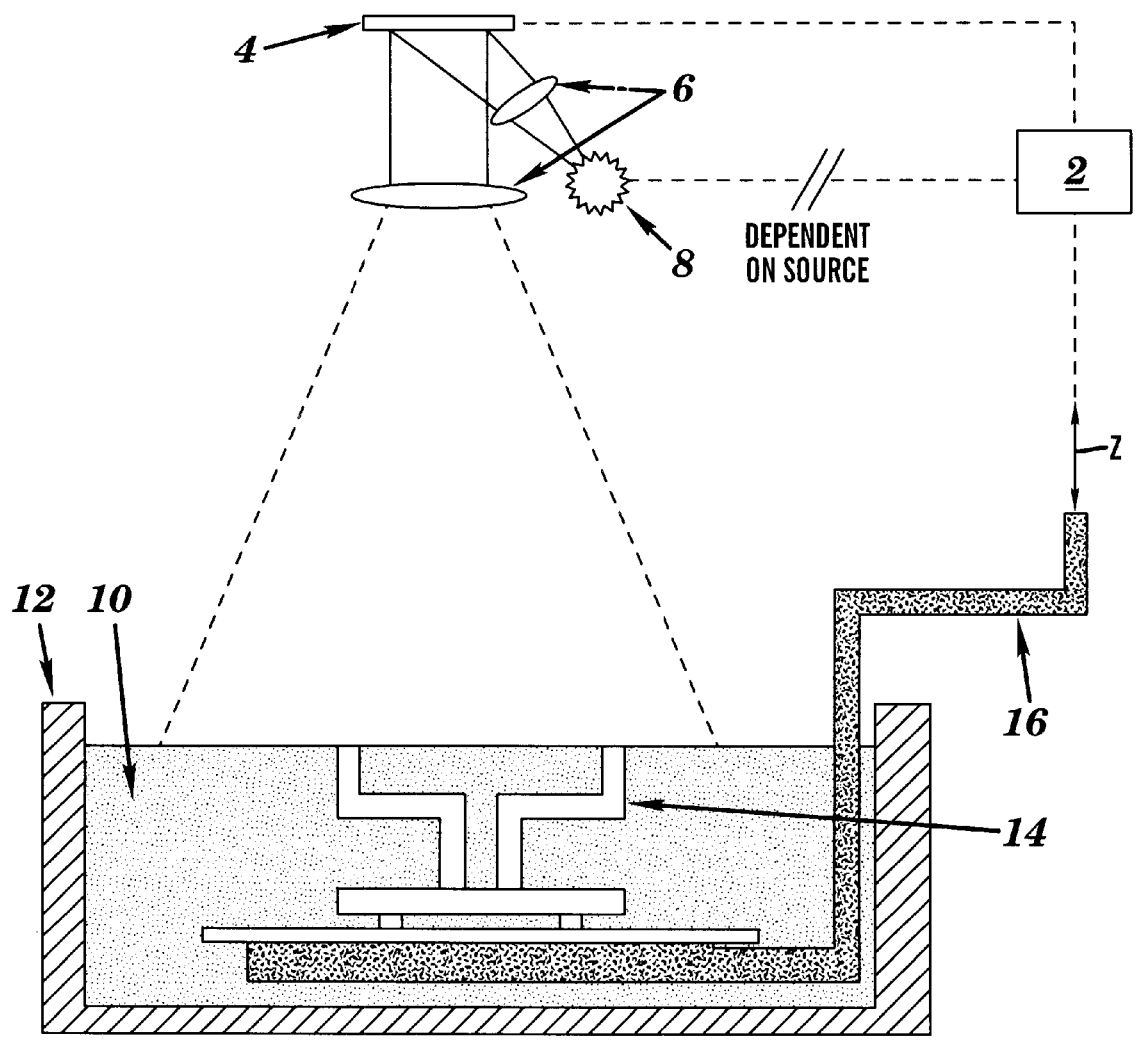
FIG. 1 is a simplified block diagram, schematic and elevational section view of a device suitable for practicing the invention, comprising, in order, from bottom to top, a container, a photocurable resin, an elevator platform, a created part, a spatial light modulator, specifically a digital niicromirror device and appropriate projection lenses, and a computer control system, in accordance with a first embodiment.

Throughout the following detailed description, similar reference characters refer to similar elements in all figures of the drawings.

Referring now to the drawings, and particularly to FIG. 1 thereof, there is shown a simplified block diagram of an overall stereolithography system of the present invention. In general, such a system comprises at least a computer control system 2, a spatial light modulator 4, appropriate projection lenses 6, an energy source 8, a solidifiable resin 10, a container 12 to hold said resin 10, a created part 14, and an elevator platform 16 to move the created part 14 with respect to the resin 10 and the spatial light modulator 4.

More specifically, the computer control system 2 includes a computer, data storage, CAD data, and appropriate interface control software to process any one of CAD solid model data, geometry output data, and a "sliced" data file. A STereoLithography or STL data file, is the current standard used to represent the surface of an object as a mesh of polygons, typically triangles. These triangles are made to completely form the inner and outer surfaces of the object. The smaller the triangles, the greater the accuracy of the object formed. This is especially true in creating curvatures. The STL file contains data for each of the X, Y, and Z coordinates of the three vertices of each of the triangles on the boundary surface. The representation also includes a unit length normal vector for each triangle. The normal points away from the solid which the triangle is bounding and indicates slope from the boundary surface.

The interface control software comprises the means for processing the part geometry into a suitable image. This image is transmitted digitally to the spatial light modulator 4. Each mirror surface on the spatial light modulator 4 represents a pixel or other suitable discrete quantity of information. As such, the interface control software transmits the image to the spatial light modulator 4 in a form capable of representing each pixel or other suitable discrete quantity of information, one such form comprising a bitmap image. The entire bitmap image, represents an individual lamina of the created part 14.

The container 12 is filled with, in the preferred embodiment, a UV curable liquid resin 10 or the like. The energy source 8 provides a source of ultraviolet or UV light, and may be operably controlled by the computer control system 2 if desired. Regardless, the UV light is directed towards the spatial light modulator 4. The spatial light modulator 4 is directed by suitable algorithms from the computer control system 2 to tilt specific mirrors in at least one of two directions. The first direction for ultimately reflecting energy onto the surface of the liquid resin 10, the second to deflect energy away from the surface of the resin 10. Proper manipulation of the mirrors causes an image stored within the data storage component of the computer control system 2 to be ultimately reflected onto the surface of the resin 10. The surface of the UV curable resin 10 is maintained at a constant level in the container 12, as the energy is reflected onto the surface of the resin 10 at sufficient intensity to cure the liquid and convert it to a solid material To increase or more intensely focus the energy from the energy source 8, the lens 6 or a plurality of appropriate lenses can be placed between the energy source 8 and the spatial light modulator 4 to focus the energy onto the spatial light modulator. Likewise, an appropriate lens 6 or lenses can be placed between the spatial light modulator 4 and the resin 10 to project the energy onto the surface of the resin 10. In this manner, a reproduction of the image is created on the surface of the resin 10. This reproduction comprises a quantity of solidified resin correlating to a single lamina of the three-dimensional part 14.

As the liquid resin 10 cures into a solid lamina, the elevator platform 16 is moved down from the surface in a programmed manner by any suitable actuator. In this way, the solid material that was initially formed is taken below the surface of the resin and new liquid resin 10 is allowed to or is made to flow over the cured lamina. A portion of this new liquid is, in turn, converted to solid material by the programmed energy source 8 and the spatial light modulator 4. This new material due to its inherent properties adhesively connects to the material below it. Precise level control of the fluid is required to properly form laminae. Fluid level can be controlled through pumping, mechanical actuation, or overflow. This process is continued until the entire three-dimensional part 14 is formed. The part 14 is then removed from the container 12, and the apparatus is ready to produce another part. Another identical part can then be produced, or some new object can be made by changing the program in the computer control system 2.

The elevator platform 16 which is used to support and hold the cured part 14 as it is being formed, as stated must be able to move at least up and down as required. Typically, after each lamina is formed, the part 14 is lowered into the resin 10 to some point below the level of the next layer to allow the uncured liquid resin 10 to more readily flow over the part. The elevator platform is then raised to the correct level prior to directing the energy onto the resin 10. The requirements for the elevator platform 16 are similar to other stereolithography systems in that it can be moved in a programmed fashion at appropriate speeds, with adequate precision, and that it is powerful enough to handle the weight of the part being formed. The elevator platform 16 can be mechanical, pneumatic, hydraulic, or electrical and may also use optical or electronic feedback to precisely control its position.

A pump (not shown) may be used to maintain a constant level of the liquid resin 10 in the container 12. Appropriate level detection system and feedback networks, well known in the art, can be used to drive a fluid pump or a liquid displacement device, which is moved out of the fluid medium as the elevator platform 16 is moved further into the fluid medium, to offset changes in fluid volume and maintain constant fluid level at the surface. Other alternatives exist which enable the energy reflected from the spatial light modulator 4 to automatically remain in sharp focus at the working surface. All of these alternatives can be readily achieved by appropriate data operating in conjunction with the computer control system 2.

Figure 2D:
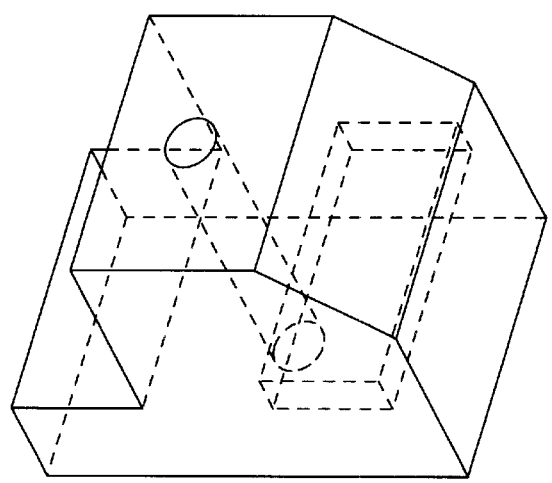
FIGS. 2a–2d depict the laminae slicing required to obtain a completed part from the FIG. 1 invention at various points in time.
Figure 2A:
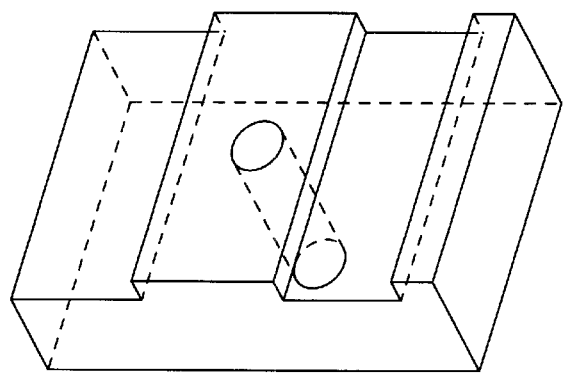
Figure 2B:
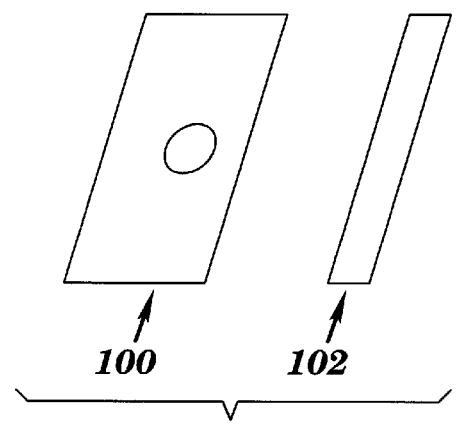

Looking now to. FIGS. 2a–2d as a representative example, this step-by-step, layer-by-layer process is illustrated. FIG. 2a depicts the part 14 at some point in time (t) as the cross-sectional laminae are being added to the part 14. FIG. 2b depicts a single lamina comprising two discrete discontinuous sections 100 and 102, at time (t+1). The spatial light modulator 4 and lenses 6 if used project each of these and similar cross-sections onto the surface of the curable resin 10 for the appropriate length of time needed to cure the resin to some predetermined depth, after which time the cross-sections forming a single lamina are lowered by operably manipulating the elevator platform 16. A quantity of the uncured resin 10 is allowed to or is made to flow over the cured lamina and the process is repeated with the next successive bitmap image.

Figure 2C:
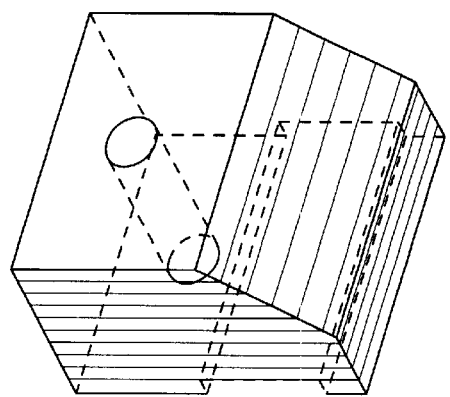

FIG. 2c depicts a plurality of these laminae over a time (t) to a time (t+n). FIG. 2a illustrates part 14 in mid-production. As can be seen sections 100 and 102 form the next sequential lamina which will be the base of FIG. 2c which represents additional sections to be added layer-by-layer. Each layer in turn comprises a complete bitmap image layered on top of the preceding layer. FIG. 2d comprises the completed part 14 made from the sectional parts depicted in FIGS. 2a, 2b, and 2c. These FIGS. depict the process in that the control software slices the three-dimensional representation of the part 14 into an ordered series of two-dimensional cross-sections of some predetermined thickness in the z-direction. For instance, were the part four inches in height and each two-dimensional lamina was set to 0.010 inch, then the finished part 14 would comprise 400 laminae each stacked and bonded one atop the other.

Many liquid state chemicals are known which can be induced to change to solid state polymer plastic by irradiation with ultraviolet light (UV) or other forms of synergistic stimulation which form a desired reaction with the medium. The synergistic stimulation includes but is not limited to electron beams, visible or invisible light, reactive chemicals applied by ink jet or via a suitable mask. Some such chemicals are currently distributed under various brand names by 3D Systems/Ciba-Geigy, DuPont, Allied Signal, and LocTite. These and similar chemicals identified are typically limited in that each must be cured by an energy source with a specific wavelength Since each has differences chemically, each afford different physical properties to the finished part as well as to the actual creation process.

Since an embodiment of the present invention utilizes an ultraviolet UVA or UVB lamp source which has greater bandwidth on the electromagnetic spectrum, the type of resin 10 is not as limiting as it would be for a more narrowly focus spectrum energy source. In fact the present invention is not limited to any specific type of lamp which enables a greater quantity of the electromagnetic spectrum to be available for the cross-sectional lamination process. Whereas prior stereolithography techniques relied upon resins optimized for very specific wavelengths, the development of future resins as well as the selection of presently available resins is no longer bound by such concerns. By using the present invention, the part 14 can be optimized to meet some desired physical property or properties.

As in previous versions of stereolithography, for cross-sectional lithography to successfully work, there must be good adhesion from one lamina to the next. Hence, the resin 10, must have several important properties. It must cure fast enough with the available UV light source to allow practical object formation times. It must be adhesive, so that successive layers will adhere to each other. Its viscosity must be low enough so that fresh liquid material will quickly flow across the surface when the elevator moves the object. It should absorb UV so that the film formed will be reasonably thin. It must be reasonably soluble in some solvent in the liquid state, and reasonably insoluble in that same solvent in the solid state, so that the object can be washed free of the UV cure liquid and partially cured liquid after the object has been formed. It should be as non-toxic and non-irritating as possible.

Though more options are available than previously were, the cured part 14 must also have desirable properties once it is in the solid state. These properties depend on the application involved, as in the conventional use of other plastic materials. Such parameters as color, texture, strength, electrical properties, flammability, and flexibility are among the properties to be considered. In addition, the cost of the material will be important in many cases.

As indicated above, the preferred embodiment utilizes a UVA or UVB lamp source. The output intensity of the source should be as high as possible since the reaction within the resin 10 is dependent upon the amount of energy that is absorbed at the surface of the resin. The more energy provided, the faster the reaction and the quicker the part 14 can be constructed. Depending upon the output mode of the energy source, i.e., whether it is via a port, light pipe, fiber, or beam, a system of the above enumerated lenses 6 may be required to focus the energy onto the surface of the resin 10.

For the sake of illustration of the scalability of the spatial light modulator 4, assume a digital micromirror device (DMD) is utilized. Currently DMDs are available which provide a 1280 by 1024 array of 1,310,720 individual mirrors, each mirror being 16 microns square with a 1 micron gap between each mirror in both directions. This gives each mirror a 17 micron effective size from center to center. The gap is insignificant, as adjacent mirrors reflecting energy onto the surface of the resin 10 will form a solid part. Therefore, for simplicity, 17 microns is used when determining the scaling necessary for selection of an appropriate lens 6.

The scaling of the mirrors determines the achievable tolerance at the resin surface as well as the size of the part that can be produced. For instance, in order to achieve standard machining tolerances of plus or minus 0.005 inches, a projection lens is required to scale the energy reflected from each mirror from 17 square microns to 254 square microns, which equates to 0.010 square inches. This requires 14× magnification by the lens 6. Given the array size of 0.857 by 0.685 inches, the maximum achievable part from the 1280 by 1024 DMD array with tolerances of plus or minus 0.005 inches would have a maximum cross section of 12.86 by 10.28 inches.

Figure 3:
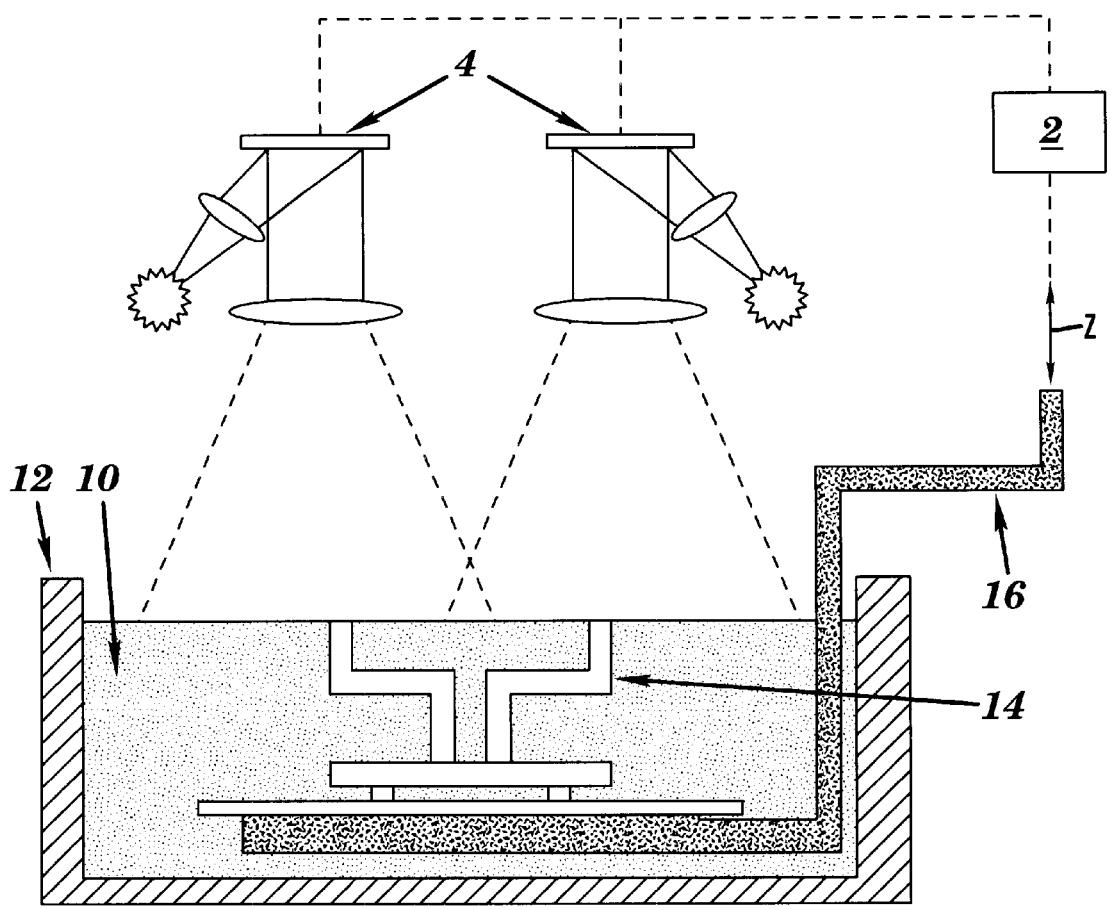
FIG. 3 depicts the FIG. 1 invention utilizing multiple spatial light modulators.

Now resorting to FIG. 3 it can be seen that more than one spatial light modulator 4 can be linked in order to process larger cross-sections or provide improved tolerances. The concept is identical to that explained above. The computer control system 2 would simply direct each spatial light modulator 4 to pivot its mirrors appropriately. The plurality of such mirrors forming the complete cross-sectional image of a single lamina.

Figure 4:
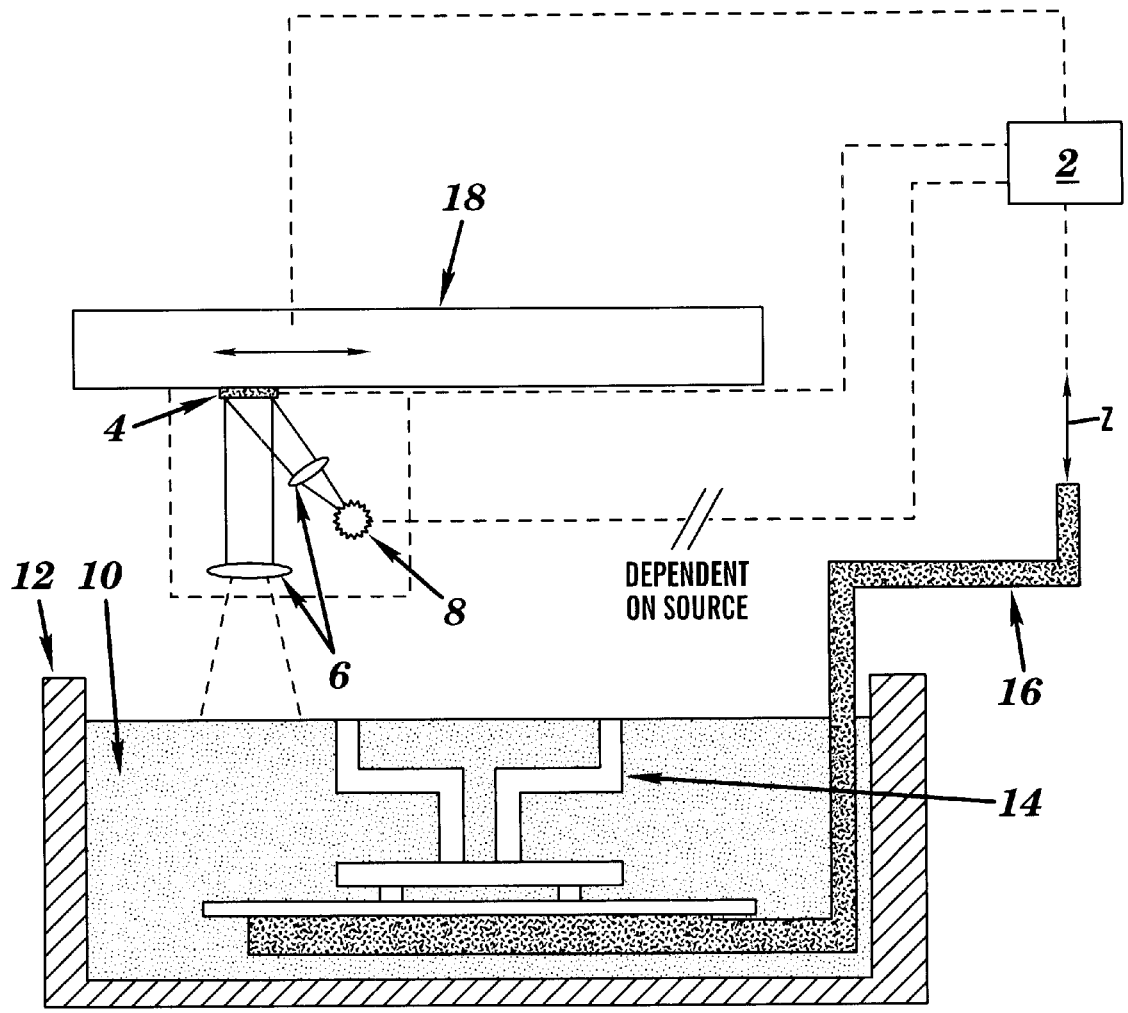
FIG. 4 depicts the FIG. 1 invention with a moving spatial light modulator.

FIG. 4 depicts another alternative to the FIG. 1 embodiment. This embodiment utilizes an overhead translation apparatus 18 to translate the spatial light modulator 4 in a linear fashion over the container 12. The preferred means to accomplish this is to utilize a DMD several mirrors in width by several hundred mirrors in length and to translate the DMD over the container 12 along the width of the DMD. The computer control system 2 would simply direct the DMD to pivot its mirrors appropriately as it travels over the resin 10. This embodiment would also work with a plurality of such DMDs as described above in conjunction with FIG. 3.

Figure 5:
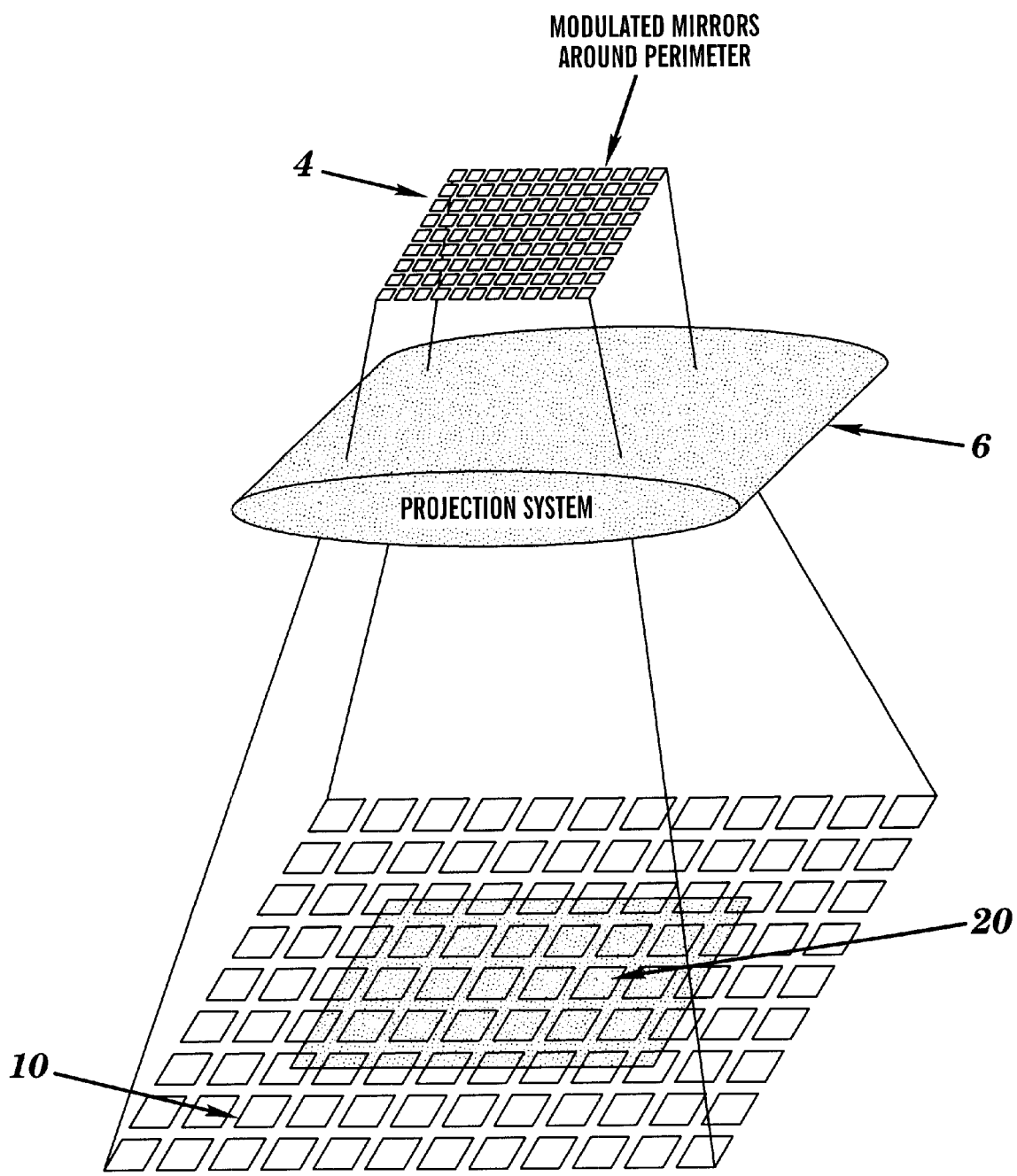
FIG. 5 depicts the FIG. 1 invention wherein at least some of the mirrors are modulated between a reflective and deflective condition.

Turning to FIG. 5, the spatial light modulator 4 is depicted along with one of the lenses 6, along with an image 20 projected onto the surface of the resin 10. This FIG. depicts a technique in which the outside mirrors representing the actual outside boundaries of the image are modulated between "on" and "off". Visually this would create a specific shade of gray, its intensity dependent upon how long the mirror were reflecting light versus deflecting light. Since the mirrors have this ability to be modulated at very high rates of speed, utilizing gray shading would achieve more desirable curing characteristics in the resin. For instance, if a dimension across some area is required to be 0.254 inches, and the array is using a projection system wherein each individual mirror is scaled to 0.010, then reflecting 25 adjacent mirrors should produce a line with a dimension of 0.250 inches, assuming perfect projection of the energy source 8 and reaction of the resin 10. Therefore, in order to create the line 0.254 inches, the twenty-sixth mirror can be rapidly modulated such that after post-processing, the resin cured 0.004 inches beyond the 0.250 inches correlating to the 25 adjacent mirrors. Additionally, this modulation method can be used to create thinner laminae, or areas of a specific lamina.

Another possible modification to each of the systems which is not depicted but is contemplated would be to utilize a high speed strobe as the energy source 8. A high speed strobe has distinct advantages given the digital nature of the spatial light modulator 4 and the high intensity energy which can be directed at the resin 10 for brief intervals of "on" time due to the nature of a modulated energy source. Appropriate control is necessary by the computer control system to operably correlate and synchronize the strobe energy source 8 with the mirrored surfaces of the spatial light modulator 4.

Figure 6:
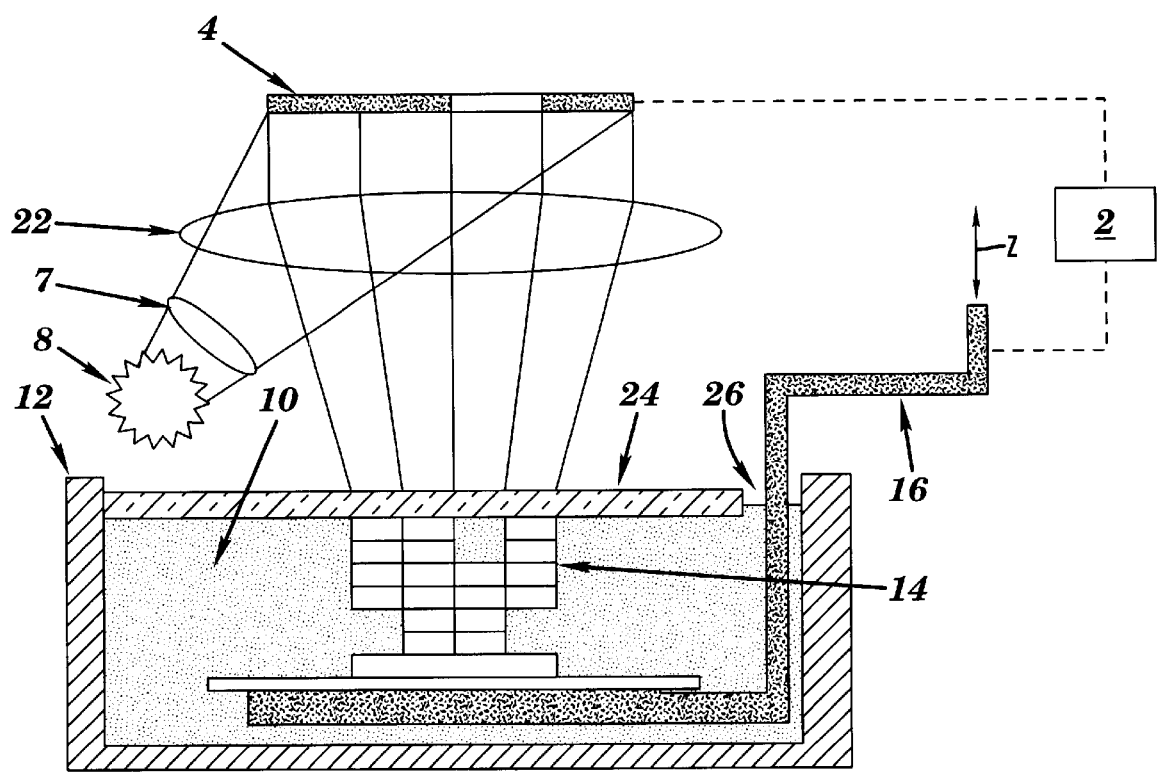
FIG. 6 depicts a microfabrication stereolithography system, in accordance with a second embodiment.

In accordance with a second embodiment of the present invention, FIG. 6 shows a microfabrication stereolithography system suitable for practicing the present invention. As described in the first embodiment, the microfabrication stereolithography system comprises at least a computer control system 2, a spatial light modulator 4, a lens 7, an energy source 8, a solidifiable or curable resin 10, a container 12 to hold the resin 10, a created part 14, an elevator platform 16 to move the created part 14 with respect to the resin 10 and the spatial light modulator 4.

The microfabrication system further includes at least one reduction lens 22. Instead of placing a projection lens 6 between the spatial light modulator 4 and the resin 10, as described in the first embodiment, which increases the size of the generated image, the microfabrication system utilizes a reduction lens 22 to reduce the size of the image generated by each individual pixel element. In this example, the image produced by each pixel is reduced from 17 microns to 1 micron (as described above, a single pixel is 16 microns square with a 1 micron gap between each mirror in both directions giving each pixel an effective size of 17 microns). The 17:1 reduction allows for the creation of a part 14 having a feature size, wherein each feature is formed by a single pixel, of approximately 1 micron by 1 micron. For example, a 600 ×800 array is capable of creating a part with a maximum cross-section of 0.6 mm x 0.8 mm.

Resolution on the order of 1 micron requires a build layer of approximately 1–5 microns (0.000039–0.000197 inches). At such small layer depths, the conventional techniques used to recoat the surface of the part 14 after being lowered into the container 12 are insufficient. Moreover, because of the delicate nature of the small part 14 any surface fluctuations may ruin the part 14 being formed. Therefore, a high-grade optical window 24 is used during the formation of the part 14 to prevent surface fluctuations by establishing and maintaining a planar resin surface of the desired thickness.

As illustrated in FIG. 6, the window 24 is mounted within the opening of the container 12, and contacts the surface of the resin 10. An opening 26 is located between the window 24 and the container 12, which allows for the displacement of liquid resin 10 as the elevator platform 16 and the part 14 are lowered into the resin 10. In addition to preventing surface fluctuations, the window 24 provides a fixed focal position upon which the energy source 8, reflected off of the spatial light modulator 4, can focus.

The window 24 also aids in the formation of planar laminae. In particular, a gap formed between the underside of the window 24 and the top surface of the elevator platform 16 establishes the thickness of the first lamina to be cured. Moreover, the underside of the window 24 provides a planarized template surface for the lamina during formation. The energy source 8 directs a stimulus, i.e., radiant energy, at the spatial light modulator 4. An elimination lens 7, located between the energy source 8 and the spatial light modulator 4, captures most of the energy radiating from the energy source 8, and focuses the energy onto the spatial light modulator 4. The computer control system 2 sends an instruction to the spatial light modulator 4 determinig which pixel elements are to be turned ON or OFF. The pixel elements that are turned ON reflect the energy through the window 24 and into a layer of the liquid resin 10 located between the window 24 and the elevator platform 16. At least a portion of the liquid resin 10 layer therebetween is cured, thereby forming a lamina of the part 14.

As the cured portions of the lamina are lowered with respect to the window 24, via the elevator platform 16 (as described above), a gap is created between the top surface of the part 14 and the window 24. In fact, the downward movement of the part 14 away from the window 24 creates a slight suction therebetween. This causes the uncured liquid resin 10 within the container 12 to be pulled into and fill the gap, thereby forming the next layer of liquid resin 10 to be cured, and the process is repeated.

The window 24 further includes a separation agent, such as a halogenated surface treatment, ie., an extremely thin Teflon™ coating, on the underside thereof. The halogenated surface of the window 24 prevents a thin layer on the top surface of the lamina from curing. The small amount of liquid resin 10 located between the window 24 and the cured lamina provides a barrier such that the lamina does not adhere to the under side of the window 24. This allows the part 14 to be lowered away from the window 24 without the need to exert a strong and potentially damaging force that would otherwise be necessary to separate the lamina from the window 24.

It should be noted that because the reduction lens 22 requires an extremely shallow field of focus in order to limit the depth of penetration of the reflected energy from the energy source 8, the system is susceptible to altered focus resulting from thermal variations. Therefor, a thermal mounting scheme, as known and used in the art, may be used to prevent refocus of the reduction lens 22.

Figure 7:
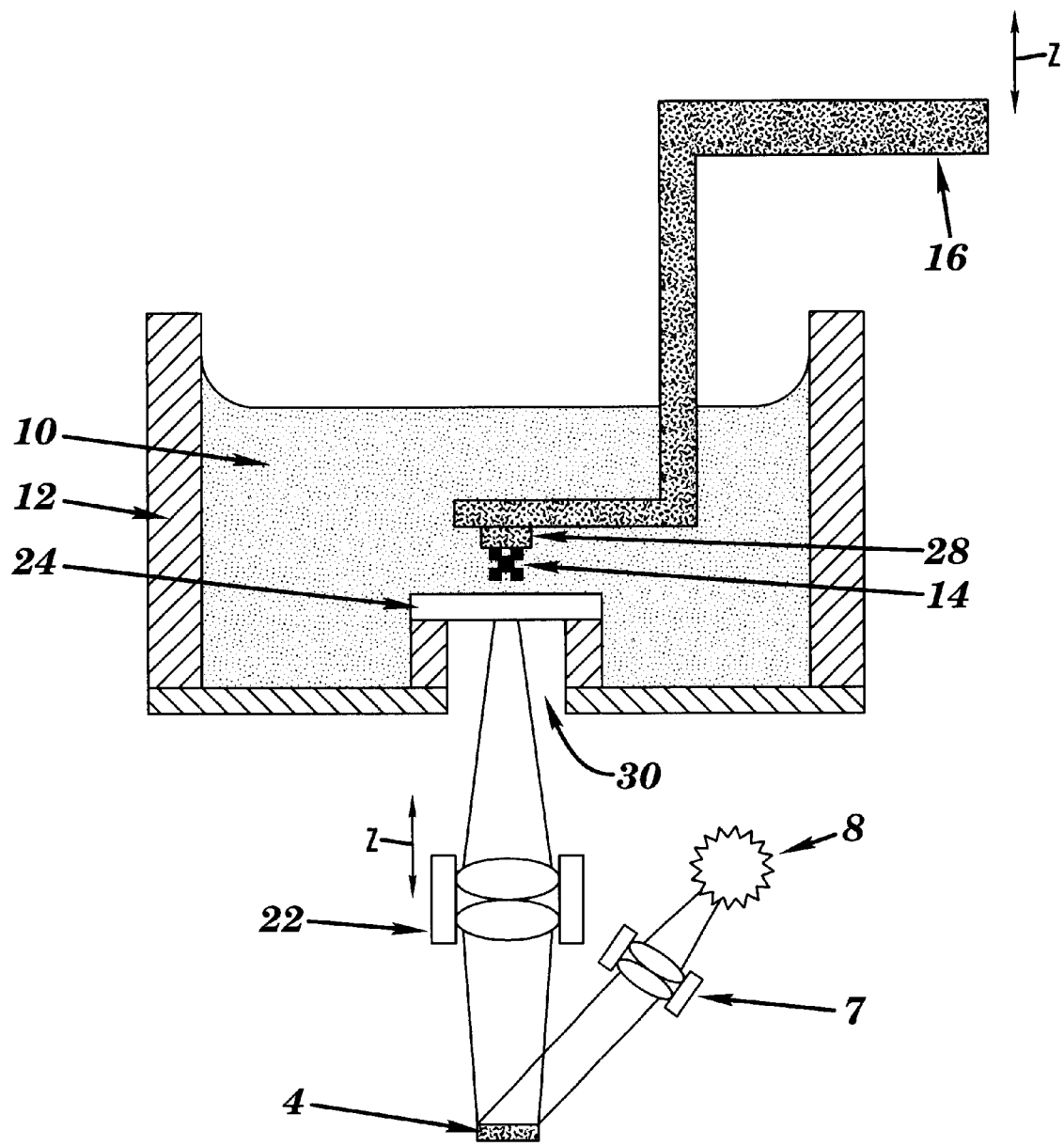
FIG. 7 depicts an inverted stereolithography system, in accordance with a third embodiment.

In accordance with a third embodiment of the present invention, FIG. 7 shows an inverted stereolithography system. The inverted system comprises an optical window 24 similar to the one described in the second embodiment above. As illustrated, the window 24 of the inverted system is located substantially near the bottom or base of the container 12. In this example, the window 24 is located inside a recessed opening 30 within the bottom of the container 12. In the alternative, the window 24 may be mounted flush with the inside surface of the base of the container 12. The window 24 is removably mounted within the recessed opening 30 of the container 12 via an adhesive, or other similar attachment mechanism known and used in the art.

As with the first and second embodiments, the energy source 8 directs a stimulus at the spatial light modulator 4. An elimination lens 7 is located between the energy source 8 and the spatial light modulator 4 to capture most of the radiant energy and focus the energy onto the spatial light modulator 4. The computer control system 2 sends an instruction to the spatial light modulator 4 determining which pixel elements are to be turned ON or OFF. The pixel elements that are turned ON reflect the energy through the window 24 and into a layer of the liquid resin located between the window 24 and the elevator platform 16. At least a portion of the liquid resin 10 layer therebetween is cured, thereby forming a lamina which adheres to a target platform 28 affixed to the underside of the elevator platform 16. The elevator platform 16 then lifts the target platform 28 and the lamina upward away from the window 24. As the lamina is pulled from the window 24, a gap forms between the surface of the lamina and the window 24, which is subsequently filled, with the aid of gravity and a slight suction created therebetween, by the liquid resin 10 within the container 12. The layer of uncured liquid resin 10 that fills the gap, as well as subsequent layers, may then be cured in a similar manner, wherein each successive lamina adheres to the previous lamina.

Upon completion of the finalized part 14, the elevator platform 16 continues to lift the part 14 completely out of the container 12 of resin 10. The part 14 is then removed from the target platform 28. A new or different target platform 28 may be used for the creation of each subsequent part 14, if so needed or desired. In such an instance, the target platform 28 is removed from the underside of the elevator platform 16, and replaced by another target platform 28. Alternatively, a single target platform 28 may be used to create several parts 14. In that case, the elevator platform 16 and the current target platform 28 are lowered into the container 12 of resin 10 to a desired position just above the window 24, and the process is repeated.

As illustrated, the top of the container 12 remains uncovered during formation of the part 14. This allows for the displacement of liquid resin 10 therein as the elevator platform 16 moves upward and downward within the container 12. In addition, the opening allows for easy removal of the part 14 upon completion, as well as allowing for the easy attachment of a new target platform 28 as needed.

A cover (not shown), however, is placed over the top of the container 12 when the window 24 needs repair or replacement. The separation agent on the surface of the window 24, which prevents the lamina from adhering to the window 24, as described above, can only be used for a discrete number of layer building iterations. After such time, the separation agent on the surface of the window 24 begins to deteriorate. The window is repaired or replaced by securely mounting a cover over the open end of the container 12. The sealed container 12 is then inverted, such that the recessed opening 30 and the window 24 are facing upward. In this manner the window 24 may be easily accessed without removing the liquid resin 10 and/or a part 14 from the container 12.

As illustrated, the lens 22 may be a reduction lens which reduces the size of the image, as described in conjunction with the microfabrication stereolithography system. In the alternative, the projection lens 6 which increases the size of the image, described in the first embodiment, may also be used between the spatial light modulator 4 and the window 24.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

I claim:

1. A method, comprising:
   (a) providing an array of controllable pixel elements;
   (b) providing a container having a medium therein capable of selective curing upon application of a stimulus;
   (c) providing a window coupled with the container, such that the medium is operatively
   (d) providing a source of the stimulus;
   (e) directing the stimulus and the array of pixel elements, such that a portion of the stimulus travels through the window of the container, wherein select regions of the medium are cured;
   (f) displacing the cured select regions of the layer with respect to the surface of the window, such that a gap is formed between the window and the cured layer, and wherein additional uncured medium fills the gap;
   (g) repeating (e) and (f) until a final layer is to be formed; and
   (f) repeating (e) to form the final layer.

2. The method of claim 1, wherein the array of controllable pixel elements comprises a spatial light modulator.

3. The method of claim 2, wherein the spatial light modulator comprises a plurality of mirrored surfaces each independently pivotable from a first to a second position.

4. The method of claim 1, wherein the medium comprises a photo curable resin.

5. The method of claim 1, further comprising preventing a portion of the layer adjacent the window from curing, such that the cured layer is displaced from the window without the use of a damaging force.

6. The method of claim 5, wherein the window further includes a separation agent on the at least one surface of the window to prevent a portion of the layer adjacent the window from curing.

7. The method of claim 6, wherein the separation agent comprises a halogenated compound.

8. The method of claim 1, further comprising allowing for a change in volume of the medium when the cured layer is displaced away from the window.

9. The method of claim 8, wherein an opening between the container and the window allows for a change in volume of the medium.

10. The method of claim 1, wherein the source of the stimulus comprises a radiant energy source capable of being reflected by the array of controllable pixel elements.

11. The method of claim 1, further comprising increasing the size of an image formed by each pixel element.

12. The method of claim 11, wherein at least one lens through which the stimulus passes before entering into the medium increases the size of the image.

13. The method of claim 1, further comprising decreasing the size of an image formed by each pixel element.

14. The method of claim 13, wherein at least one lens through which the stimulus passes before entering into the medium decreases the size of the image.

15. The method of claim 14, wherein the image produced by the at least one lens has a resolution of approximately 1 micron by 1 micron.

16. The method of claim 1, further comprising:
   turning each of the plurality of pixel elements either ON or OFF, such that pixel elements turned ON reflect the stimulus into the medium, and pixel elements turned OFF deflect the stimulus away from the medium.

17. The method of claim 16, wherein a computer control system determines which pixel elements are turned ON or OFF.

18. The method of claim 1, wherein displacing the cured select regions of the layer away from the surface of the window further comprises:
   providing an elevator platform upon which the cured layer rests; and
   lowering the elevator platform following curing of the select regions of the layer.

19. The method of claim 1, wherein displacing the cured select regions of the layer with respect to the surface of the window further comprises:
   providing an elevator platform having a target platform attached thereto, wherein the three dimensional object being formed adheres to the target platform; and
   raising elevator platform away from the window.

20. The method of claim 19, wherein the window is substantially at the bottom of the container.

21. The method of claim 19, wherein the container further includes a recess within a base of the container.

22. The method of claim 21, wherein the window is mounted within the recess.

23. The method of claim 19, further comprising directing the stimulus through the window within the recess of the container.

24. A method, comprising:
   providing at least one spatial light modulator, having a plurality of controlled pixel elements;
   providing a container having a medium therein and a window within the container, wherein the medium is operatively positioned with respect to at least one surface of the window;
   providing a source of stimulus;
   iterating for i=1, 2, . . . , M, wherein M is the maximum number of layers to be formed, and wherein iteration I comprises:
      if i≦M, directing the stimulus and the pixel elements of the spatial light modulator, such that select pixel elements reflect the stimulus, directing the stimulus into an $i_{th}$ layer of the medium, wherein select regions of the $i^{th}$ layer are cured;
      if i<M, moving the cured $i^{th}$ layer with respect to the window, such that a gap is formed between the window and the cured $i^{th}$ layer, wherein the uncured medium fills the gap; and ending iteration i.

25. The method of claim 24, further comprising lowering the cured $i^{th}$ layer away from the window.

26. The method of claim 25, wherein the window is mounted above the medium.

27. The method of claim 24, further comprising raising the cured $i^{th}$ layer away from the window.

28. The method of claim 27, wherein the window is mounted substantially below the medium.

29. The method of claim 24, wherein the spatial light modulator comprises a plurality of mirrored surfaces each independently pivotable from a first to a second position.

30. The method of claim 24, further comprising removing the three dimensional object from the container following the $M^{th}$ iteration.

31. The method of claim 24, further comprising reducing a size of an image projected from the pixel elements into the uncured $i^{th}$ layer.

32. The method of claim 31, wherein a lens between the pixel elements and the medium reduces the size of the image.

33. The method of claim 31, wherein the image projected is approximately 1 micron by 1 micron.

34. The method of claim 24, further comprising preventing a portion of the $i^{th}$ layer adjacent the window from adhering to the window.

35. The method of claim 34, wherein a separation agent on an at least one surface of the window prevents the portion of the $i^{th}$ layer adjacent the window from adhering to the window.

36. An apparatus for forming a three dimensional object, comprising:
   a container having a selectively curable medium therein;
   a window coupled with the container, wherein the selectively curable medium is operatively positioned with respect to at least one surface of the window;
   a source of stimulus, such that the stimulus is capable of curing the selectively curable medium;
   a controllable array of pixel elements capable of selectively projecting the stimulus through the window to a layer of the selectively curable medium; and
   a device capable of displacing a cured quantity of the selectively curable medium with respect to the window.

37. The apparatus of claim 36, further comprising:
   at least one lens between the array of pixel elements and the curable medium.

38. The apparatus of claim 37, wherein the at least one lens increases an image projected into the layer of selectively curable medium.

39. The apparatus of claim 37, wherein the at least one lens decreases an image projected into the layer of selectively curable medium.

40. The apparatus of claim 39, wherein the projected image decreased by the at least one lens is approximately 1 micron by 1 micron.

41. The apparatus of claim 36, wherein the window further comprises a separation agent on a surface contacting the selectively curable medium.

42. The apparatus of claim 41, wherein the separation agent on the surface of the window comprises a halogenated compound.

43. The apparatus of claim 36, wherein the window is mounted substantially near a top of the container.

44. The apparatus of claim 36, wherein the window is mounted substantially near a bottom of the container.

45. The apparatus of claim 36, wherein the window is mounted within a recess of the container.

46. The apparatus of claim 36, further including an opening between the window and the container.

47. The apparatus of claim 36, wherein the device capable of displacing a cured quantity comprises an elevator platform.

48. The apparatus of claim 47, wherein the elevator platform further includes a target platform.

49. The apparatus of claim 48, wherein the target platform is mounted to the elevator platform between the elevator platform and the window.

50. The apparatus of claim 48, wherein a first cured layer adheres to a surface of the target platform included with the elevator platform.

51. The method of claim 36, wherein the controllable array of pixel elements comprises a plurality of mirrored surfaces each independently pivotable from a first to a second position.

* * * * *

United States Patent and Trademark Office
Certificate

Patent No. 6,500,378 B1                                                                    Patented: December 31, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffrey M. Smith, Pittsfield, MA; Laura B. Smith, Pittsfield, MA; Roger D. Whitmer, Pittsfield, MA; and Gerald E. Bender, Cheshire, MA.

Signed and Sealed this Eighteenth Day of April 2006.

MICHAEL COLAIANNI
*Supervisory Patent Examiner*
Art Unit 1732